Jan. 20, 1959 W. A. DICKIE ET AL 2,869,848
FILAMENTARY MATERIAL
Filed March 25, 1955 2 Sheets-Sheet 1

Inventors:
W. A. DICKIE
J. G. N. DREWITT
H. E. B. YOUNG
by
Attorneys

United States Patent Office 2,869,848
Patented Jan. 20, 1959

2,869,848

FILAMENTARY MATERIAL

William Alexander Dickie, London, and James Gordon Napier Drewitt and Harry Edward Bellairs Young, Spondon, near Derby, England, assignors to British Celanese Limited, a corporation of Great Britain Application March 25, 1955, Serial No. 496,875

Claims priority, application Great Britain April 9, 1954

12 Claims. (Cl. 263—30)

This invention relates to the production of filamentary materials and particularly to the production of textile fibres and other filamentary products by the extrusion of fusible filament-forming materials in the molten state. It is a particular object of the present invention to provide an improved apparatus for the continuous melting of solid filament-forming materials for this purpose.

According to the present invention, an apparatus for the melting of solid filament-forming material comprises a vessel having two internal, annular concentric surfaces converging downwards towards one another to form a narrow annular slit between them, and means for supplying heat to the outer of said surfaces, to melt filament-forming material retained by said surfaces above said slit. The fused material runs down through the slit to the bottom of the vessel, whence it can be drawn away and extruded in the form of filaments. By the use of an annular heated surface communicating with a single annular slit, the solid material introduced into the vessel is treated in the same way at all angular positions round the axis of the vessel, and in consequence is brought to a uniformly molten condition, whereby the molten material to be extruded is in a homogeneous state and the extrusion thereof into filaments of uniform character is facilitated. Moreover, the relative simplicity of the means required for heating the outer annular surface makes possible a high rate of heat supply to said surface, while the uniform melting action of the apparatus enables advantages to be taken of this circumstance, so that the material can be melted at a high rate per unit area of melting surface, without local overheating of the material.

Most conveniently, only the outer of the two annular surfaces is heated, and is in the form of a downwardly converging truncated internal cone, having an opening at the bottom below which the vessel increases in diameter, leaving the edge of the opening as a downwardly projecting lip from which the fused material can drip into the lower part of the vessel, and to which any fragments of unmolten material small enough to have passed through the annular slot may cling until they are melted. For greater security, the surface may terminate, immediately above the lip, in a narrow annular portion extending upwards and inwards to form a weir by which such fragments are more positively retained. The narrow annular portion, and the lip itself can be constituted by a separate ring, lodged within the inner edge of the downwardly converging cone.

The inner of the annular concentric surfaces may conveniently be the outer surface of an inner member in the form of a cylinder or downwardly flared cone, the lower edge of which reaches close to the heated outer surface. Preferably, the edge of the inner member approaches the heated surface at a point spaced above the lower edge of the heated surface so that, after passing through the annular slot between said inner member and said surface, the material still has some distance to travel before reaching and falling from the lower edge of said surface. Alternatively, however, the lower edge of the inner member may be disposed close to the lower edge of the heated surface so that the annular slot is formed between said lower edges. In either case the part of the vessel below the heated surface may be of conical form, converging to an outlet for molten material at the bottom, and with a maximum diameter at the top substantially exceeding that of the lower edge of the heated surface.

The supply of heat to the outer surface may be effected in any convenient manner. Thus the heated surface may constitute the inner wall of an annular vessel to which a heating fluid is supplied at the temperature required for the melting of the filament-forming material. Alternatively, the heated surface may be the inner surface of a substantial annular block of metal provided with electrical heating elements, e. g. wound round the outside, the weight of metal in said block giving it a substantial heat capacity which exerts a steadying influence on the supply of heat to the filament-forming material. The upper part of the vessel, above the heated surface, may be of any convenient form, e. g. cylindrical or conical, and may be provided with an opening at the top for charging the vessel continuously or intermittently with solid filament-forming material.

The inner member can be supported from the inner walls of the vessel, or from the heated surface itself, by being made in the form of a spider having limbs extending outwards from its outer surface (the inner of the two annular concentric surfaces) and having feet which lodge in cleats on the inner wall of the vessel, or against the heated surface at a level above that at which the solid material begins to melt. The feet of the spider may, if desired, be cut away so as to minimize their contact with the supporting surface and consequently to minimize the conduction of heat along the legs of the spider to the inner member. The inner member may be closed at the top, or a deflecting cap may be arranged over it, to deflect solid filament-forming material introduced into the vessel, outwardly from the axis of the vessel and to the heated surface.

Means may be provided in association with the vessel, for the supply of an inert gas, under pressure if desired, and for the drawing off of said inert gas so as to maintain a continuous current thereof through the vessel. Means also may be provided for detecting the level of molten material in the bottom of the vessel and, if desired, for regulating the supply of heat to the heated surface in order to maintain said level substantially constant. Suitable lagging is preferably provided round the vessel, particularly in the neighbourhood of and below the level of the heated surface, and it is desirable that such lagging should extend to the pump employed for extrusion, and so far as possible, to the spinning jet and the filter (if any) preceding said jet.

The fusible filament-forming materials to the melting and melt-spinning of which the apparatus of the present invention is applicable include high-melting polyamides, e. g. polyhexamethylene adipamide and polyaminocaproic acid, and high-melting polyesters, e. g. polyethylene terephthalate.

By way of example, two forms of melt-spinning apparatus in accordance with the present invention will now be described in greater detail with reference to the accompanying drawings, in which.

Figure 1:
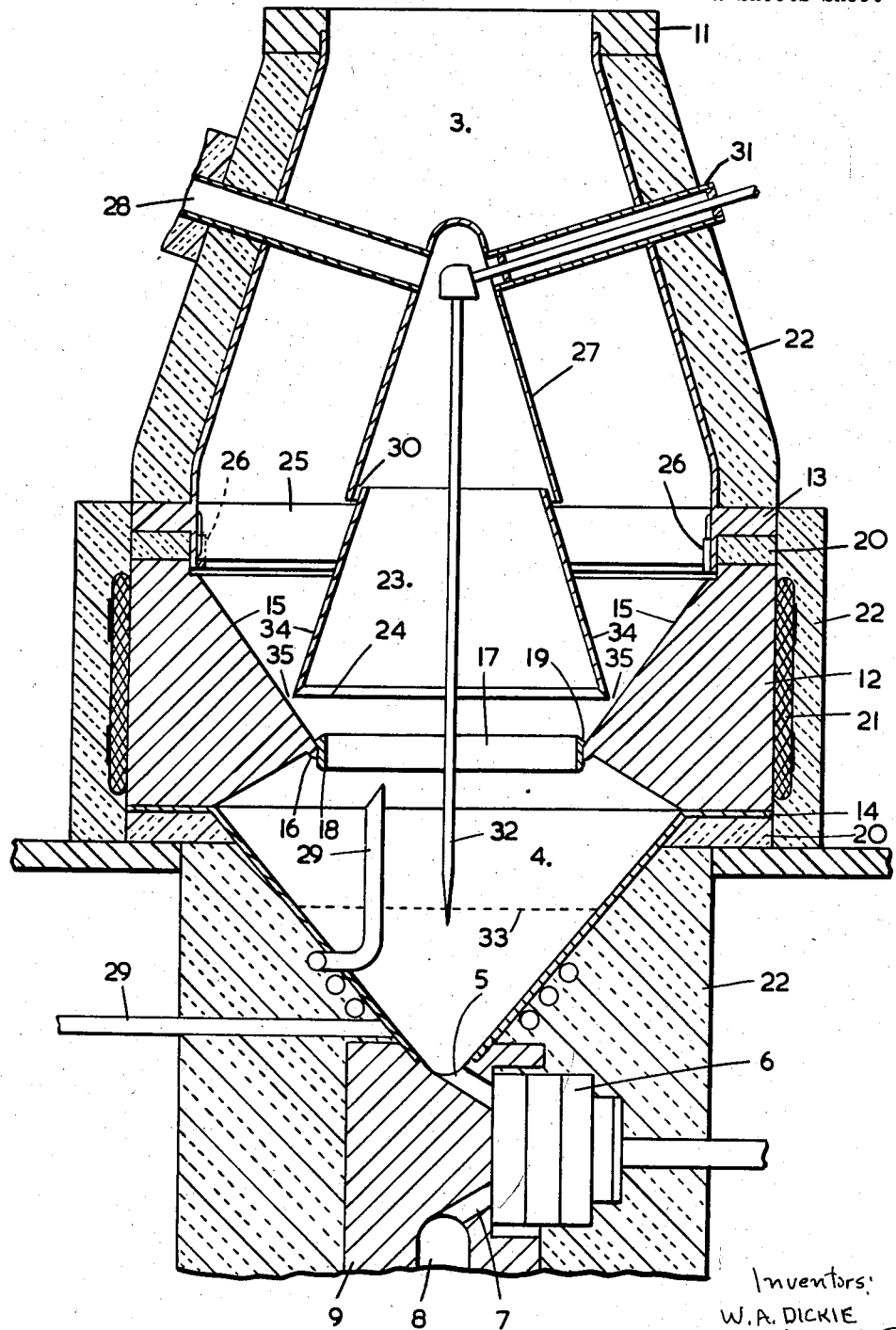
Figure 1 is a sectional side elevation of one form of apparatus.

The apparatus shown in Figure 1 is in the form of a vessel having a cylindrical frusto-conical upper part 3 and an inverted-conical lower part 4 from the narrow lower end of which a passage 5 leads to a spinning pump 6. A further passage 7 leads in turn to a filter chamber 8 feeding a spinning jet (not shown) having orifices therein for the extrusion of filtered molten material into the form of filaments. These passages are formed in a heavy metal block 9 of substantial heat capacity having appropriately shaped recesses therein for the accommodation of the conical lower end 4 of the vessel, the spinning pump 6 and the filter assembly and jet. The upper part 3 of the vessel is flanged at the top at 11 for connection to means (not shown) for the continuous feeding of solid material into the upper part 3.

Between the upper and lower parts 3, 4, is the heating member, a heavy metal block 12 of cylindrical external form, to the upper and lower faces of which are secured externally projecting flanges 13, 14 formed on the upper part 3 and the lower conical part 4 respectively of the vessel. The internal surface 15 of the block 12 is frusto-conical, converging downwards at about 40° from the vertical, to an annular lip 16 projecting below the main under-surface of the block. Lodged on the lower edge of the conical surface 15, above and inside the lip 16, is a ring 17 of stainless steel whose lower edge 18 constitutes a further lip extending below the lip 16 while its upper surface 19 extends at right-angles to the surface 15, upwards and inwards, to constitute a narrow weir. Round the outer surface of the block 12 is strapped a flexible blanket 21 containing electrical heating elements by which heat is supplied to the block 12 for the melting of the filament-forming material supplied to the vessel. Outside the blanket 21, and also round the upper and lower parts 3, 4 of the vessel and the block 9, is a heavy layer of heat-insulating lagging 22. In addition, insert rings 20 of heat insulating material are disposed below the flanges 13, 14.

Within the vessel, and concentric therewith, is a downwardly flared stainless steel cone 23 of which the lower edge 24 is internally bevelled and is spaced at about $\frac{1}{16}''$ from the conical surface 15 of the block 12 at a level about two-thirds of the way down that surface. Four horizontal legs 25 extend from the outside of the cone, the feet of which are supported by cleats 26 on the inner surface of the upper part 3, and are cut away to minimize their area of contact therewith and to reduce heat conduction along them to the cone 23.

The top of the cone 23 leads into a hood 27 connected to draw-off pipe 28 which passes through the wall of the upper part 3 and serves to draw off nitrogen or other inert gas supplied under slight pressure to the vessel. This is supplied to the conical lower part 4 by a supply pipe 29 which is coiled round the wall of the conical part 3, passes through said wall, and then turns vertically upwards. Inert gas is also supplied, with the filament-forming material, through the flange 11, and reaches the draw-off 28 by way of the gap 30 between the cone 23 and the hood 27. By these means a continuous current of inert gas is passed through the vessel so as to maintain an inert atmosphere therein and to carry off any volatile products that may be released by the melting of the filament-forming material. Extending through a tube 31 opposite the draw-off pipe 28 and at right-angles to the wall of the hood 27, is a level-indicating electrode 32. This is in the form of a conductor connected to the walls of the vessel through a suitable indicating circuit giving a reading depending on the electrical resistance between said walls and the electrode 32. Owing to the appreciable electrical conductivity of the molten filament-forming material, this reading affords an indication of the depth of immersion of the tip of the electrode in the pool of molten material indicated at 33 in the bottom of the vessel, and therefore of the level of said pool.

In the operation of the apparatus, solid filament forming material in the form of suitably sized chips or flakes is charged continuously into the upper part 3 of the vessel. Current is supplied to the heating elements in the blanket 21, and the heat generated is conducted to the inner conical surface 15 of the block 12, where it melts the material retained in contact with that surface by the outer surface 34 of the inner cone 23. The fused material runs down the surface 15 and passes through the annular slit 35 between the surface 15 and the edge of the cone 23, solid material being retained at the slit. Fragments of solid material small enough to pass through the slit 35 receive further heat from the part of the internal conical surface 15 lying below the slit 35 and are fused before they drop from the downwardly extending lip 18 of the annular member 17 at the lower edge of that surface. Any such fragments as might reach the member 17 are retained by the weir constituted by its upper surface 19 until melted. If conditions are such that the member 17 can be dispensed with, the fused material drops directly from the lip 16. The fused material dropping from the lip 18 collects as a pool at 33 in the bottom of the lower part 4 of the vessel, whence it is drawn away by the spinning pump 6 for extrusion. The level of the surface of the pool 33 is indicated by the indicating circuit of the electrode 32, and the current supplied to the blanket 21 can be controlled by that circuit or in accordance with its readings, so as to maintain the level of the pool 33 substantially constant.

Figure 2:
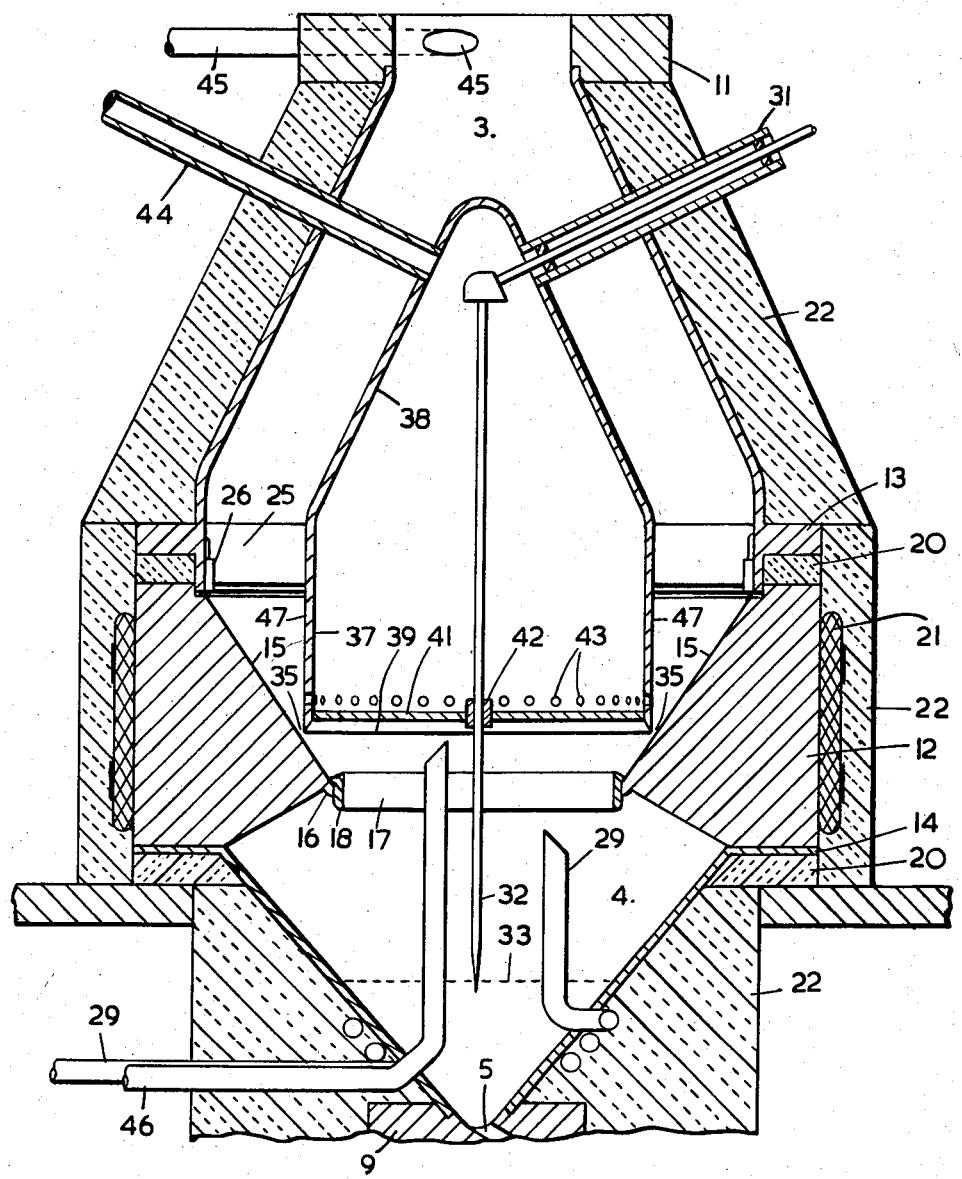
Figure 2 is a similar view of a modification of the apparatus of Figure 1.

The apparatus shown in Figure 2 is a modification of that shown in Figure 1 which it resembles in most respects. It differs, however, in the arrangements provided for the flow of inert gas through the vessel. In place of the inner cone 23 and separate hood 27 there is provided a single member having a cylindrical lower part 37 integral with a conical upper part 38, both supported by radial legs 25 as in Figure 1. Immediately above the lower edge 39 of the part 37, which is spaced at a distance of $\frac{1}{16}''$ from the surface 15, the interior of the part 37 is closed by a plate 41 having a central insulating gland 42 through which the electrode 32 extends. Immediately above the plate 41 the cylindrical part is pierced with a ring of perforations 43. The pipe 44 entering the conical upper part 38 and corresponding to the pipe 28 of Figure 1 is not used to draw off inert gas but to supply it, the inert gas escaping from the interior of the conical and cylindrical parts 38, 37 by way of the perforations 43. The gas thus escaping is drawn off at the top of the vessel by means of a draw-off pipe 45 passing horizontally through the flange 11, tangentially to the interior thereof. In the lower part of the vessel, below the annular slit 35, inert gas enters by a supply pipe 29 as in Figure 1, but is drawn off independently of the gas supplied through the pipe 44 by a further pipe 46. The inert gas supplied through the pipe 29 in Figure 2 is warmed as in Figure 1, by the coiling of the pipe 29 round the bottom of the vessel. The inert gas supplied through the pipe 44, however, is preferably cool so as to prevent undue heating of the internal annular surface 47 by its proximity to the outer surface 15. Alternatively, however, if it is desired to keep the internal surface 47 hot as well as heating the outer surface 15, this can be done by supplying hot inert gas through the inlet pipe 44. In the arrangement described above, if the annular slit 35 is closed by the presence of molten material flowing therethrough, the currents of inert gas in the upper and lower parts of the vessel are entirely independent of one another.

Having described our invention, what we desire to secure by Letters Patent is:

1. Apparatus for melting particles of solid filament-forming material for the melt-spinning thereof into filamentary products, said apparatus comprising a vessel for receiving said particles, said vessel having an internal continuously annular wall surface, a member within said vessel having an external continuously annular surface concentric with said wall surface, said annular surfaces converging downwards towards one another to form a narrow annular slit between them, said slit being narrower than said particles, whereby solid filament-forming material is retained at said slit, and means for supplying heat to said wall surface to melt filament-forming material supplied between said surfaces and retained thereby above said slit.

2. Apparatus for melting particles of solid filament-forming material for the melt-spinning thereof into filamentary products, said apparatus comprising a vessel for receiving said particles, said vessel having a continuously annular downwardly converging part-conical internal wall surface, a member within said vessel having an external continuously annular surface concentric with and converging downwards towards said wall surface to form therewith a narrow annular slit, said slit being narrower than said particles, whereby solid filament-forming material is retained at said slit, and means for supplying heat to said wall surface to melt filament-forming material supplied between said surfaces and retained thereby above said slit.

3. Apparatus for melting particles of solid filament-forming material for the melt-spinning thereof into filamentary products, said apparatus comprising a vessel for receiving said particles, said vessel having, over part of its depth, an internal continuously annular wall surface terminating at its lower edge in a lip depending downwards into a part of said vessel of greater internal diameter than said lip, a member within said vessel having an external continuously annular surface concentric with said wall surface, said annular surfaces converging downwards towards one another to form a narrow annular slit between them, said slit being narrower than said particles, whereby solid filament-forming material is retained at said slit, and means for supplying heat to said wall surface to melt filament-forming material supplied between said surfaces and retained thereby above said slit.

4. Apparatus for melting particles of solid filament-forming material for the melt-spinning thereof into filamentary products, said apparatus comprising a vessel for receiving said particles, said vessel having a continuously annular downwardly converging part-conical internal wall surface, a member within said vessel having an external continuously annular surface concentric with and converging downwards towards said wall surface to form a narrow annular slit between the lower edge of said external annular surface and said wall surface above the lower edge thereof, said slit being narrower than said particles, whereby solid filament-forming material is retained at said slit, and means for supplying heat to said wall surface to melt filament-forming material supplied between said surfaces and retained thereby above said slit.

5. Apparatus for melting solid filament-forming material for the melt-spinning thereof into filamentary products, said apparatus comprising a vessel having, over part of its depth, a continuously annular downwardly converging part-conical internal wall surface terminating at its lower edge in a narrow annular surface extending inwards and upwards to form a weir, a member within said vessel having an external continuously annular surface concentric with and converging downwards towards said wall surface to form a narrow annular slit between the lower edge of said external annular surface and said wall surface at a level above said weir, and means for supplying heat to said wall surface to melt filament-forming material supplied between said surface and retained thereby above the slit.

6. Apparatus for melting solid filament-forming material for the melt-spinning thereof into filamentary products, said apparatus comprising a vessel having, over part of its depth, a continuously annular downwardly converging part-conical internal wall surface, a ring lodged within the inner and lower edge of said wall surface, said ring having a narrow annular upper surface extending upwards and inwards from said wall surface to form a weir and having a lower edge in the form of a lip depending downwards into a part of said vessel of greater diameter than said lip, a member within said vessel having an external continuously annular surface concentric with and converging downwards towards said wall surface to form a narrow annular slit between the lower edge of said external annular surface and said wall surface at a level above said weir, and means for supplying heat to said wall surface to melt filament-forming material supplied between said surfaces and retained thereby above said slit.

7. Apparatus for melting particles of solid filament-forming material for the melt-spinning thereof into filamentary products, said apparatus comprising a vessel for receiving said particles, said vessel consisting, over part of its depth, of an annular metal block having a continuously annular downwardly converging part-conical internal wall surface, a member within said vessel having an external continuously annular surface concentric with and converging downwards towards said wall surface to form therewith a narrow annular slit, said slit being narrower than said particles, whereby solid filament-forming material is retained at said slit, and means for supplying heat to the outside of said block to melt filament-forming material supplied between said surfaces and retained thereby above said slit.

8. Apparatus for melting particles of solid filament-forming material for the melt-spinning thereof into filamentary products, said apparatus comprising a vessel for receiving said particles, said vessel having a continuously annular downwardly converging part-conical internal wall surface, a member within said vessel having a continuously annular part-conical external surface flaring downwards so as to converge towards said wall surface to form therewith a narrow annular slit, said slit being narrower than said particles, whereby solid filament-forming material is retained at said slit, and means for supplying heat to said wall surface to melt filament-forming material supplied between said surfaces and retained thereby above said slit.

9. Apparatus for melting particles of solid filament-forming material for the melt-spinning thereof into filamentary products, said apparatus comprising a vessel for receiving said particles, said vessel having an internal continuously annular wall surface, a member within said vessel having an external continuously annular surface concentric with said wall surface, said annular surfaces converging downwards towards one another to form a narrow annular slit between them, said slit being narrower than said particles, whereby solid filament-forming material is retained at said slit, means for supplying heat to said wall surface to melt filament-forming material supplied between said surfaces and retained thereby above said slit, conduits for supplying inert gas to the parts of the interior of said vessel above and below said slit and a further conduit communicating with the interior of said member for drawing off said inert gas.

10. Apparatus for melting particles of solid filament-forming material for the melt-spinning thereof into filamentary products, said apparatus comprising a vessel for receiving said particles, said vessel having an internal continuously annular wall surface, a member within said vessel having an external continuously annular surface concentric with said wall surface, said annular surfaces converging downwards towards one another to form a narrow annular slit between them, said slit being narrower than said particles, whereby solid filament-forming material is retained at said slit, means for supplying heat to said wall surface to melt filament-forming material supplied between said surfaces and retained thereby above said slit, conduits for supplying inert gas to said vessel above and below said slit and for withdrawing said inert gas supplied below said slit, and a conduit communicating with the interior of said member for the withdrawal of said inert gas supplied above said slit, said member being closed at the bottom and being formed with openings above its lower edge.

11. Apparatus for melting solid filament-forming material for the melt-spinning thereof into filamentary products, said apparatus comprising a vessel consisting over part of its depth of an annular metal block having a continuously annular downwardly converging part-conical internal wall surface, a ring lodged within the inner and lower edge of said wall surface, said ring having a narrow annular upper surface extending upwards and inwards from said wall surface to form a weir and having a lower edge in the form of a lip depending downwards into part of said vessel of greater diameter than said lip, a member within said vessel having a continuously annular part-conical external surface flaring downwards so as to converge towards said wall surface to form a narrow annular slit between the lower edge of said external surface and said wall surface at a level above said weir, means for supplying heat to the outside of said block to melt filament-forming material supplied between said surfaces and retained thereby above said slit, conduits for supplying inert gas to the parts of the interior of said vessel above and below said slit and a further conduit communicating with the interior of said member for drawing off said inert gas.

12. Apparatus for melting solid filament-forming material for the melt-spinning thereof into filamentary products, said apparatus comprising a vessel consisting over part of its depth of an annular metal block having a continuously annular downwardly converging part-conical internal wall surface, a ring lodged within the inner and lower edge of said wall surface, said ring having a narrow annular upper surface extending upwards and inwards from said wall surface to form a weir and having a lower edge in the form of a lip depending downwards into part of said vessel of greater diameter than said lip, an external continuously annular surface concentric with and converging downwards towards said wall surface to form a narrow annular slit between the lower edge of said external annular surface and said wall surface at a level above said weir, means for supplying heat to the outside of said block to melt filament-forming material supplied between said surfaces and retained thereby above said slit, conduits for supplying inert gas to said vessel above and below said slit and for withdrawing said inert gas supplied below said slit, and a conduit communicating with the interior of said member for the withdrawal of said inert gas supplied above said slit, said member being closed at the bottom and being formed with openings above its lower edge.

References Cited in the file of this patent

UNITED STATES PATENTS

| | | |
|---|---|---|
| 865,659 | Scott | Sept. 10, 1907 |
| 1,147,165 | Hampton | July 20, 1915 |
| 1,742,586 | De Reytere | Jan. 7, 1930 |
| 2,165,242 | Drill | July 11, 1939 |

FOREIGN PATENTS

| | | |
|---|---|---|
| 476,576 | Italy | May 8, 1951 |
| 1,049,356 | France | Dec. 29, 1953 |